(12) United States Patent
Pentesco et al.

(10) Patent No.: US 11,076,528 B2
(45) Date of Patent: Aug. 3, 2021

(54) MULCHING APPARATUS AND RELATED COMPONENTS

(71) Applicant: Tigercat International Inc., Cambridge (CA)

(72) Inventors: Robert Anthony Pentesco, Paris (CA); Jacob Wheatley Fisher, Dundas (CA)

(73) Assignee: TIGERCAT INTERNATIONAL INC., Cambridge (CA)

( * ) Notice: Subject to any disclaimer, the term of this patent is extended or adjusted under 35 U.S.C. 154(b) by 365 days.

(21) Appl. No.: 15/898,497

(22) Filed: Feb. 17, 2018

(65) Prior Publication Data

US 2018/0235144 A1 Aug. 23, 2018

Related U.S. Application Data

(60) Provisional application No. 62/460,469, filed on Feb. 17, 2017.

(51) Int. Cl.
*A01D 34/00* (2006.01)
*B02C 13/282* (2006.01)
(Continued)

(52) U.S. Cl.
CPC ........... *A01D 34/005* (2013.01); *A01D 34/42* (2013.01); *A01D 34/435* (2013.01); *A01G 3/002* (2013.01); *B02C 13/282* (2013.01); *B02C 13/2804* (2013.01); *B02C 13/30* (2013.01); *B02C 18/18* (2013.01); *A01D 34/56* (2013.01); *B02C 2013/2825* (2013.01); *B02C 2021/023* (2013.01); *B02C 2201/066* (2013.01)

(58) Field of Classification Search
CPC .... A01D 34/005; A01D 34/412; A01D 34/43; A01D 34/81; A01D 34/42–435; B02C 13/282; B02C 2013/2825; B02C 2201/06; E01H 5/09–098; A01G 3/002
See application file for complete search history.

(56) References Cited

U.S. PATENT DOCUMENTS

| 1,374,207 A | * | 4/1921 | Jacobson | B02C 13/282 |
| | | | | 241/189.2 |
| 1,516,419 A | * | 11/1924 | Case | A01D 34/42 |
| | | | | 56/294 |

(Continued)

FOREIGN PATENT DOCUMENTS

| CA | 2995544 A1 | * | 8/2018 | ............ B02C 13/30 |
| GB | 189044 A | * | 11/1922 | ............ A01D 34/49 |
| GB | 2042318 A | * | 9/1980 | ............ A23J 1/007 |

*Primary Examiner* — Thomas B Will
*Assistant Examiner* — Joan D Misa
(74) *Attorney, Agent, or Firm* — Gowling WLG (Canada) LLP; Neil W. Henderson

(57) ABSTRACT

A mulching apparatus including: a housing including a front opening and an inner wall; a rotor mounted in the front opening of the housing adjacent to the inner wall; and a liner mounting system for mounting a replaceable wear liner between the rotor and the inner wall, the liner mounting system including: an upper mounting provided at an upper edge of the inner wall, the upper mounting configured to releasably connect with the wear liner; and a lower mounting provided at a lower edge of the inner wall, the lower mounting configured to support the wear liner against the upper mounting and secure the wear liner to the inner wall.

10 Claims, 17 Drawing Sheets

(51) Int. Cl.
*A01D 34/42* (2006.01)
*A01D 3/00* (2006.01)
*B02C 21/02* (2006.01)
*B02C 13/30* (2006.01)
*B02C 13/28* (2006.01)
*A01D 34/43* (2006.01)
*B02C 18/18* (2006.01)
*A01G 3/00* (2006.01)
*A01D 34/56* (2006.01)

(56) References Cited

U.S. PATENT DOCUMENTS

| | | | | |
|---|---|---|---|---|
| 1,872,233 | A * | 8/1932 | Borton | B02C 13/282 241/189.1 |
| 2,162,783 | A * | 6/1939 | Moyer | A01D 34/49 56/14.7 |
| 2,268,860 | A * | 1/1942 | Edens | B02C 13/282 241/88.3 |
| 2,590,065 | A * | 3/1952 | Mott | A01D 34/535 56/289 |
| 2,634,567 | A * | 4/1953 | Huitema | A01D 34/53 56/14.7 |
| 2,685,774 | A * | 8/1954 | Williams | A01D 34/62 56/249 |
| 2,875,956 | A * | 3/1959 | Lykken | B02C 19/005 241/55 |
| 2,941,731 | A * | 6/1960 | Lykken | B02C 11/00 241/5 |
| 3,371,434 | A * | 3/1968 | Wandscheer | E01H 5/076 37/256 |
| 3,478,448 | A * | 11/1969 | Bacon | E01H 5/098 37/252 |
| 3,479,805 | A * | 11/1969 | Soteropulos | A01D 61/008 56/14.1 |
| 3,581,746 | A * | 6/1971 | Louks | A01D 75/282 460/9 |
| 3,829,031 | A * | 8/1974 | Kron | B02C 13/282 241/182 |
| 3,893,634 | A * | 7/1975 | Schmidt | B02C 13/282 241/182 |
| 4,054,194 | A * | 10/1977 | Davis | B28C 5/4248 193/10 |
| 4,175,710 | A * | 11/1979 | Robertson | B02C 13/08 241/285.3 |
| 4,189,903 | A * | 2/1980 | Jackson | A01D 34/005 56/17.5 |
| 4,550,554 | A * | 11/1985 | Lundahl | A01D 34/412 56/294 |
| 4,595,318 | A * | 6/1986 | Viesselmann | A01F 25/183 406/193 |
| 4,905,460 | A * | 3/1990 | Toman | A01B 45/026 56/12.7 |
| 4,964,502 | A * | 10/1990 | Buschbom | A01D 23/02 198/642 |
| 5,035,317 | A * | 7/1991 | Buschbom | A01F 25/2009 198/642 |
| 5,129,217 | A * | 7/1992 | Loehr | A01D 42/005 56/13.6 |
| 5,184,451 | A * | 2/1993 | Savipakka | A01D 34/82 56/17.5 |
| 5,190,140 | A * | 3/1993 | Buschbom | A01D 23/02 198/642 |
| 5,212,938 | A * | 5/1993 | Zenner | A01D 34/005 56/17.5 |
| 5,655,720 | A * | 8/1997 | Hixon | B02C 13/04 241/189.1 |
| 5,884,466 | A * | 3/1999 | Willmering | A01D 34/81 56/320.1 |
| 7,451,944 | B2 * | 11/2008 | Hall | B02C 2/005 241/207 |
| 7,690,176 | B2 * | 4/2010 | Shinn | A01G 23/00 56/11.9 |
| 8,146,846 | B2 * | 4/2012 | Denis | B02C 18/184 241/101.77 |
| 9,699,960 | B2 * | 7/2017 | Schreiner | A01D 34/005 |
| 2010/0181403 | A1 * | 7/2010 | Kum | B02C 13/282 241/182 |
| 2015/0047310 | A1 * | 2/2015 | Schreiner | A01D 34/005 56/320.1 |
| 2017/0245433 | A1 * | 8/2017 | Derra | A01D 34/71 |
| 2017/0273237 | A1 * | 9/2017 | Schreiner | A01D 34/005 |

* cited by examiner

MULCHING APPARATUS AND RELATED COMPONENTS

CROSS-REFERENCE TO RELATED APPLICATIONS

This application claims the benefit of U.S. Provisional Patent Application Ser. No. 62/460,469, filed Feb. 17, 2017, the content of which is incorporated herein by reference in its entirety.

FIELD

The present disclosure relates generally to a mulching apparatus for mulching material, and, more particularly, to components of the mulching apparatus such as teeth, a drive train, chain guard and the like.

BACKGROUND

Mulchers are pieces of equipment that typically include a tracked or wheeled carrier that has a mulching apparatus mounted to the carrier for breaking down or mulching materials such as standing trees, logs, branches, brush, and/or the like. The mulching apparatus typically comprises a spinning rotor having a plurality of teeth for engaging with the material and cutting/breaking the material into smaller pieces.

A mulcher usually includes control mechanisms such as hydraulic circuits for adjusting the conditions of the mulching apparatus such as position, height, angle, and/or the like. During operation, an operator may use the control mechanism to adjust the mulching apparatus while engaging the material.

A mulching apparatus can be subject to significant forces during operation and, as such, various parts can be subject to wear and failure over time. Further, since some mulching apparatus can be used in remote locations, it can be important for components or parts of the mulching apparatus to be easily accessible for service and replacement of worn-out or broken components/parts in the field. As such, there is a need for improved mulching apparatuses in various fields and, in particular, in the forestry industry.

SUMMARY

According to one aspect herein, there is provided a mulching apparatus including: a housing including a front opening and an inner wall; a rotor mounted in the front opening of the housing adjacent to the inner wall; and a liner mounting system for mounting a replaceable wear liner between the rotor and the inner wall, the liner mounting system including: an upper mounting provided at an upper edge of the inner wall, the upper mounting configured to releasably connect with the wear liner; and a lower mounting provided at a lower edge of the inner wall, the lower mounting configured to support the wear liner against the upper mounting and secure the wear liner to the inner wall. In this way, the wear liner can be slid in engagement at one end and then securely supported or fastened at the other such that the end that has been slid into engagement is maintained in engagement. In some cases, the end that is slid into engagement can also be securely fastened.

In some cases, the upper mounting may include a top plate and an upper attachment mechanism securing the top plate to the upper edge of the inner wall, wherein the top plate and the upper attachment mechanism may be configured such that the wear liner can be slid between the top plate and the inner wall and held in place when the attachment mechanism is engaged.

In some other cases, the upper attachment mechanism may include a plurality of upper bolts that are arranged to match with slots cut into a liner top edge of the wear liner such that the slots of the wear liner can be slid against the bolts.

In still other cases, the lower mounting may include a bottom plate and a lower attachment mechanism configured such that the lower attachment mechanism removably secures the bottom plate and wear liner to the inner wall. In this case, the lower attachment mechanism may include a plurality of lower bolts that pass through the bottom plate, wear liner and inner wall.

In some cases, at least one of the upper mounting and the lower mounting may be configured to also act as a shearing/cutting element.

In some further cases, at least one of the upper mounting and the lower mounting may include a plurality of sections wherein each section is separately removable from the inner wall. In this case, each section may also be configured to be reversible such that an unworn side can be turned to be situated where a worn side was previously. This may also apply even where the upper and lower mounting are not in sections.

According to another aspect herein, there is provided a tooth assembly for a rotor of a mulching apparatus, the tooth assembly including: a tooth mount mountable to the rotor, the tooth mount including one of a male or female T-connector; and a tooth mountable to the tooth mount, wherein the tooth includes: the other of the male or female T-connector; and a plough shaped extension protruding from a front side thereof toward the rotor surface and in front of the tooth mount, wherein the T-connector is wedge-shaped for engaging the tooth on the tooth mount.

In some cases, the tooth assembly may further include a support mechanism for supporting the tooth on the tooth mount when the tooth is not fully engaged with the tooth mount but otherwise not supporting the tooth.

In some cases, a width of the tooth assembly may be tapered from front to back.

In further cases, the tooth assembly may further include a stress relief feature at a forward end of the T-connector.

In still further cases, the tooth may include more than two carbide cutting elements.

According to another aspect herein, there is provided a mulching apparatus including: a housing including a front opening and an inner wall; a rotor mounted in the front opening of the housing adjacent to the inner wall; and a drive train for driving the rotor, the drive train including: a drive shaft connected to the rotor; a motor including a motor shaft; a removable wear gear connecting the motor shaft and the drive shaft, wherein the wear gear is formed from a material that is softer than a material of the drive shaft or motor shaft.

In some cases, the drive shaft may further include an axial bore in fluid communication the wear gear for introducing a lubrication fluid thereto. In this case, the drive train may further include a purge port in fluid communication with the axial bore. Further, the purge port may be a dedicated purge port.

According to another aspect herein, there is provided a wear liner for a mulching apparatus, the wear liner including: a body configured to fit around a rotor of the mulching apparatus; a plurality of slots at an upper end of the body; and a flange provided at a lower end of the body and extending rearward from the body, the flange provided with a plurality of fastening holes.

According to another aspect herein, there is provided a chain assembly for a mulching apparatus, the chain assembly including: a plurality of chains; a chain mounting plate including a plurality of chain holders, each of the plurality of chain holders configured to support an individual chain; and a chain support plate removably attached to the chain mounting plate to hold the plurality of chains on the chain holders of the chain mounting plate.

In some cases, each of the plurality of chain holders may include a plurality of holes configured to receive one or more links of each of the plurality of chains and support the plurality of chains in place.

Various other aspects and cases will be apparent upon reviewing the drawings and description below.

BRIEF DESCRIPTION OF THE DRAWINGS

FIGS. 5A to 5C are side views showing a process of installing the wear liner of FIG. 3 into the mulching apparatus of FIG. 1, wherein FIG. 5A shows an upper edge of the wear liner being inserted into a gap between the rotor and the inner wall of the mulching apparatus, FIG. 5B shows a lower edge (with flange) of the wear liner rotating up as the wear liner moves into the gap, and FIG. 5C shows the lower edge (with flange) abutting against a lower edge of the inner wall;

FIGS. 8A to 8E show a tooth mount of the tooth assembly of FIG. 7A; wherein

FIG. 8A is a rear perspective view of the tooth mount,

FIG. 8B is a front perspective view of the tooth mount shown in FIG. 8A,

FIGS. 8C and 8D are front and side views, respectively, of the tooth mount of FIG. 8A, and FIG. 8E is a cross-sectional view of the tooth mount shown in FIG. 8A;

FIGS. 9A to 9C show a tooth of the tooth assembly of FIG. 7A, wherein

FIG. 9A is a front perspective view of the tooth,

FIG. 9B is a rear perspective view of the tooth shown in FIG. 9A, and

FIG. 9C is a cross-sectional view of the tooth shown in FIG. 9A;

FIGS. 13A to 13D show a tooth mount of the tooth assembly of FIG. 12A; wherein

FIG. 13A is a front perspective view of the tooth mount,

FIG. 13B is a rear perspective view of the tooth mount shown in FIG. 13A,

FIG. 13C is a front view of the tooth mount shown in FIG. 13A, and

FIG. 13D is a cross-sectional view of the tooth mount of FIG. 13A;

FIGS. 14A to 14F show a tooth of the tooth assembly of FIG. 12A, wherein

FIG. 14A is a front perspective view of the tooth,

FIG. 14B is a rear perspective view of the tooth shown in FIG. 14A,

FIGS. 14C to 14E are front, rear, and side views of the tooth shown in FIG. 14A, and FIG. 14F is a cross-sectional view of the tooth shown in FIG. 9A;

DETAILED DESCRIPTION

Figure 1:
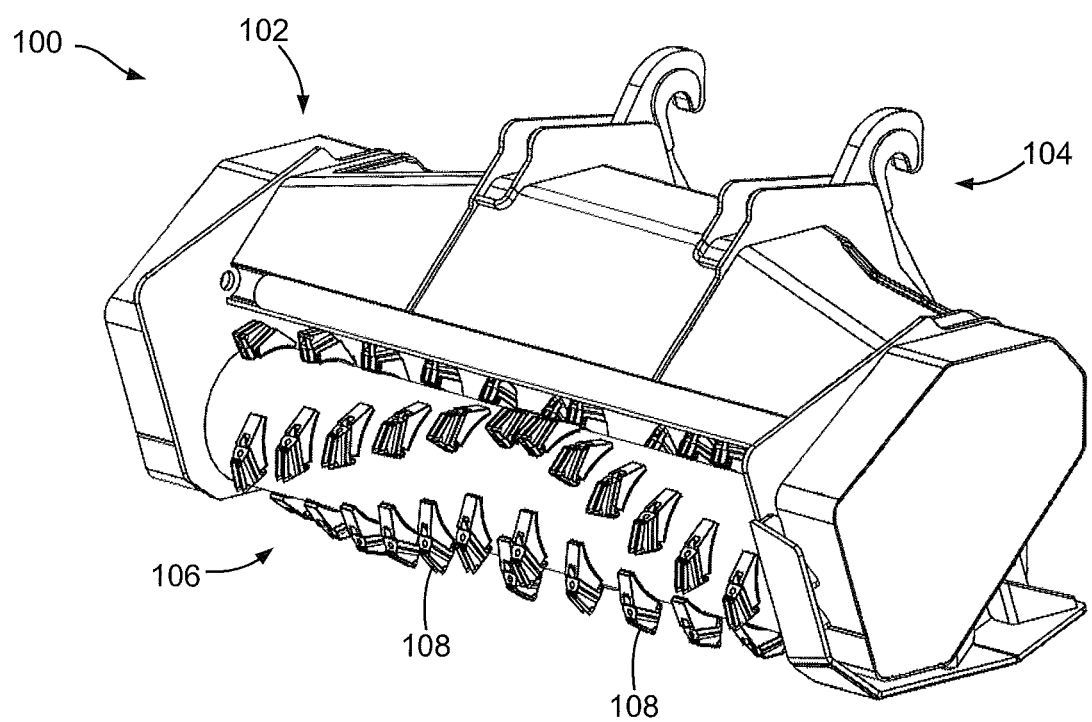
FIG. 1 is a perspective view of a mulching apparatus, according to embodiments herein.

FIG. 1 illustrates a mulching apparatus 100 according to an embodiment herein. In this particular case, the mulching apparatus 100 is configured for attaching, installing or otherwise coupling to a piece of equipment such as a carrier, a forklift, a bobcat, a loader, a tractor, a heavy-duty vehicle, or the like, for breaking down or mulching materials such as standing trees, logs, branches, brush, or the like. The equipment may be tracked or wheeled and may have one or more engines and/or motors for operation. In other cases, the mulching apparatus 100 may be permanently attached to the equipment.

The mulching apparatus 100 includes a frame 102, an attachment mechanism 104, shown as hook lugs but could be any of various attachment mechanisms, and a rotor 106. The frame 102 houses a drive train including a motor and a drive shaft (not shown in FIG. 1) for the rotor 106. The rotor 106 includes a plurality of tooth assemblies 108.

Figure 2:
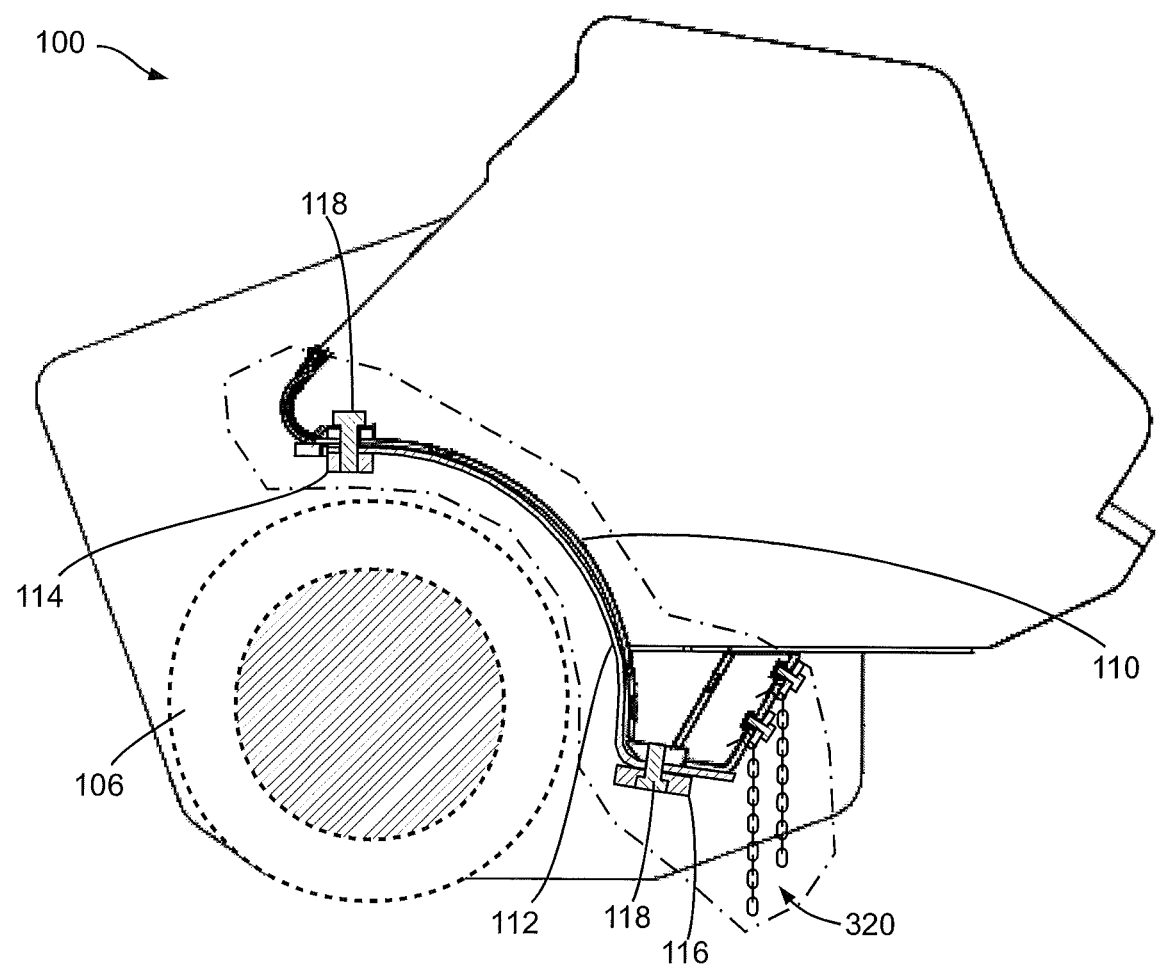
FIG. 2 is a partial cross-sectional view of the mulching apparatus of FIG. 1.

FIG. 2 is a partial cross-sectional view of the mulching apparatus of FIG. 1. FIG. 2 illustrates an inner wall 110 of the frame 102, adjacent to the rotor 106. During operation, as the rotor 106 turns, the inner wall 110 can be subject to wear from the material being mulched. As such, a wear liner 112 is removably provided between the inner wall 110 and the rotor 106. The wear liner 112 is held in place by an upper mounting and a lower mounting. In this case, the upper mounting includes an upper plate 114 and suitable fasteners 118 and the lower mounting includes lower plate 116 and suitable fasteners 118. The suitable fasteners 118 are, in this case bolts 118, but could also be clamps, shim plates/wedges, tapered dowels, breakable/removable welds and/or the like. An example embodiment using bolts 118 is described in greater detail herein.

Figure 3A:
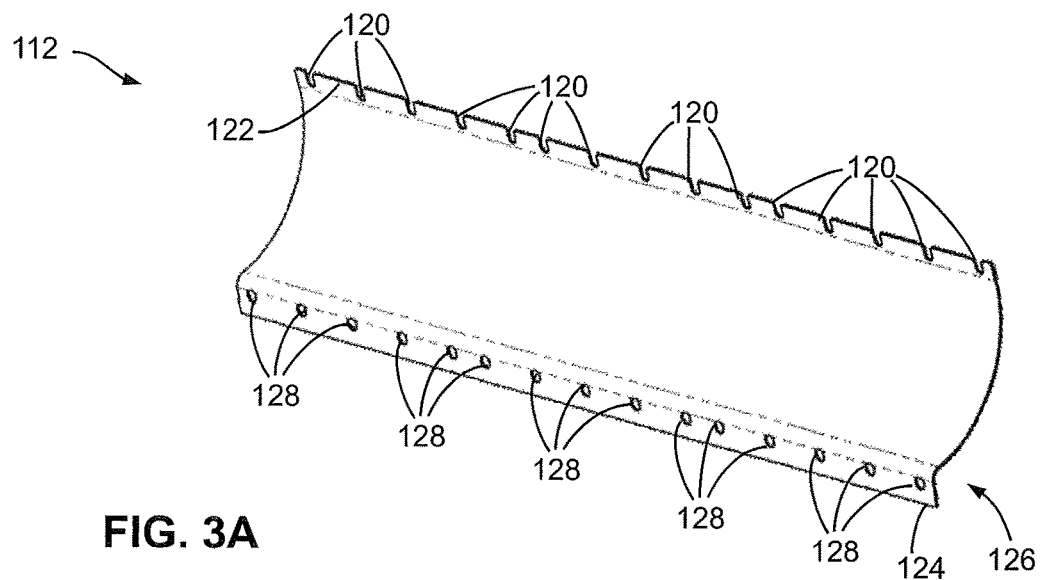
FIG. 3A is a perspective view of a wear liner according to an embodiment herein.
Figure 3B:
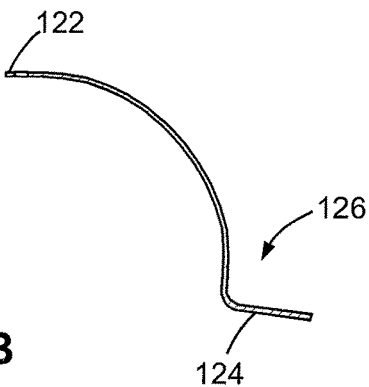
FIG. 3B is a cross-sectional view of the wear liner of FIG. 3A.

The wear liner 112 is a replaceable, sacrificial component made of a suitable wear-resistant and/or abrasion-resistant material such as hardened steel. FIG. 3A shows a perspective view of the wear liner 112 and FIG. 3B shows a cross-sectional profile of the wear liner 112. As shown in FIGS. 3A and 3B, the wear liner 112 according to some embodiments includes a plurality of slots 120 along an upper edge 122 thereof. The wear liner 112 also includes a flange 124 that projects from a lower edge 126 thereof. The flange 124 includes a plurality of fastening holes 128.

Figure 4:
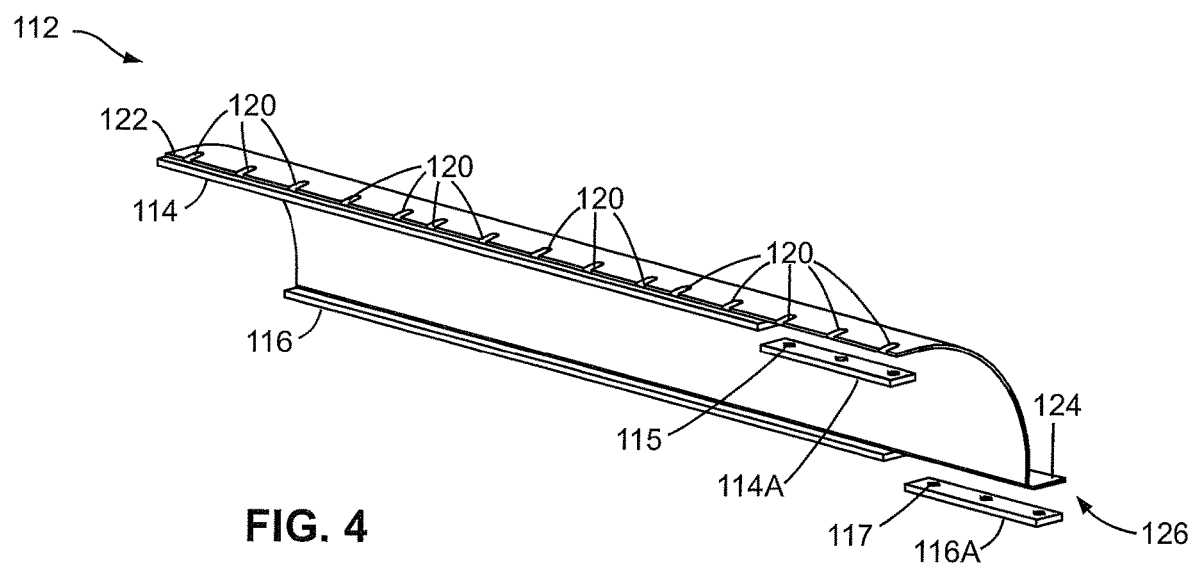
FIG. 4 is a perspective view of the wear liner of FIG. 3A and edge plates according to an embodiment herein.

FIG. 4 illustrates the upper and lower plates 114, 116 that hold the wear liner 112 in place. As illustrated in FIG. 4, the plates 114, 116 may either be one continuous piece or may be made up of plate sections 114A, 116A. Upper plate 114 includes fastening holes that correspond with the plurality of slots 120 on the wear liner 112. Similarly, lower plate 116 has fastening holes that correspond with the fastening holes on the flange 124. As will be evident from FIG. 2, the plates 114 and 116, and, in particular, the lower plate 116 may assist in mulching by providing a shear/blunt edge that material fed into the rotor 106 may contact during operation. In this way, the plates 114 and 116 may both secure the wear liner 112 and also act as functional surfaces contributing to the mulching.

In order to help protect the bolts 118 in the lower plate 116, the bolts 118 may be countersunk into the lower plate 116. Further, if the upper and lower plates 114 and 116 are formed of plate sections 114A and 116A, it is possible to replace only worn plate sections 114A and 116A when there is wear on particular plate sections 114A and 116A. For example, there can often be more wear at a center area of the mulching apparatus 100 and plate sections 114A and 116A in that center area may need to be replaced more frequently. In some embodiments, the plate sections 114A and 116A, or the plates 114, 116 if not in sections, may also be configured to be reversible such that a worn plate section 114A and 116A may be turned around and used in a reversed position to extend the life of the plate section 114A and 116A. In this situation, it may be more convenient for the plate sections 114A and 116A to be symmetrical about a center line so that an additional fastening hole is not needed.

In these embodiments, the wear liner 112 has a profile substantially matching the profile of the inner wall 110 but the liner may have any suitable profile such that the wear liner 112 does not interfere with the spinning or rotation of the rotor 106, and such that the wear liner 112 may be rotated out of or into position without being obstructed by the rotor 106 or other components of the mulching apparatus 100, as described in further detail below. For example, the wear liner 112 may have a stepped/splined profile in which a curved shape is formed with a plurality of straight sections or the like.

Figure 5A:
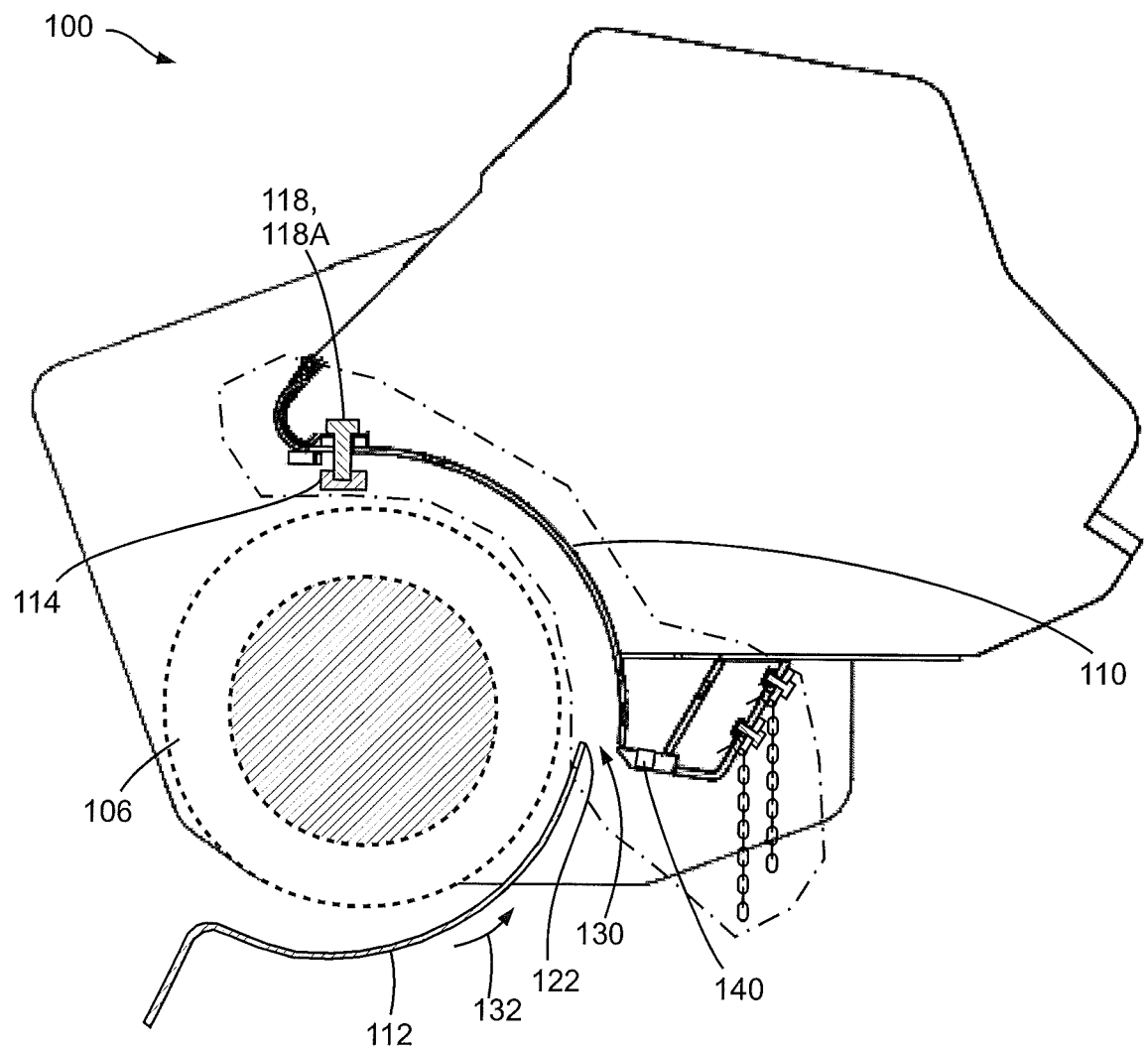
Figure 5B:
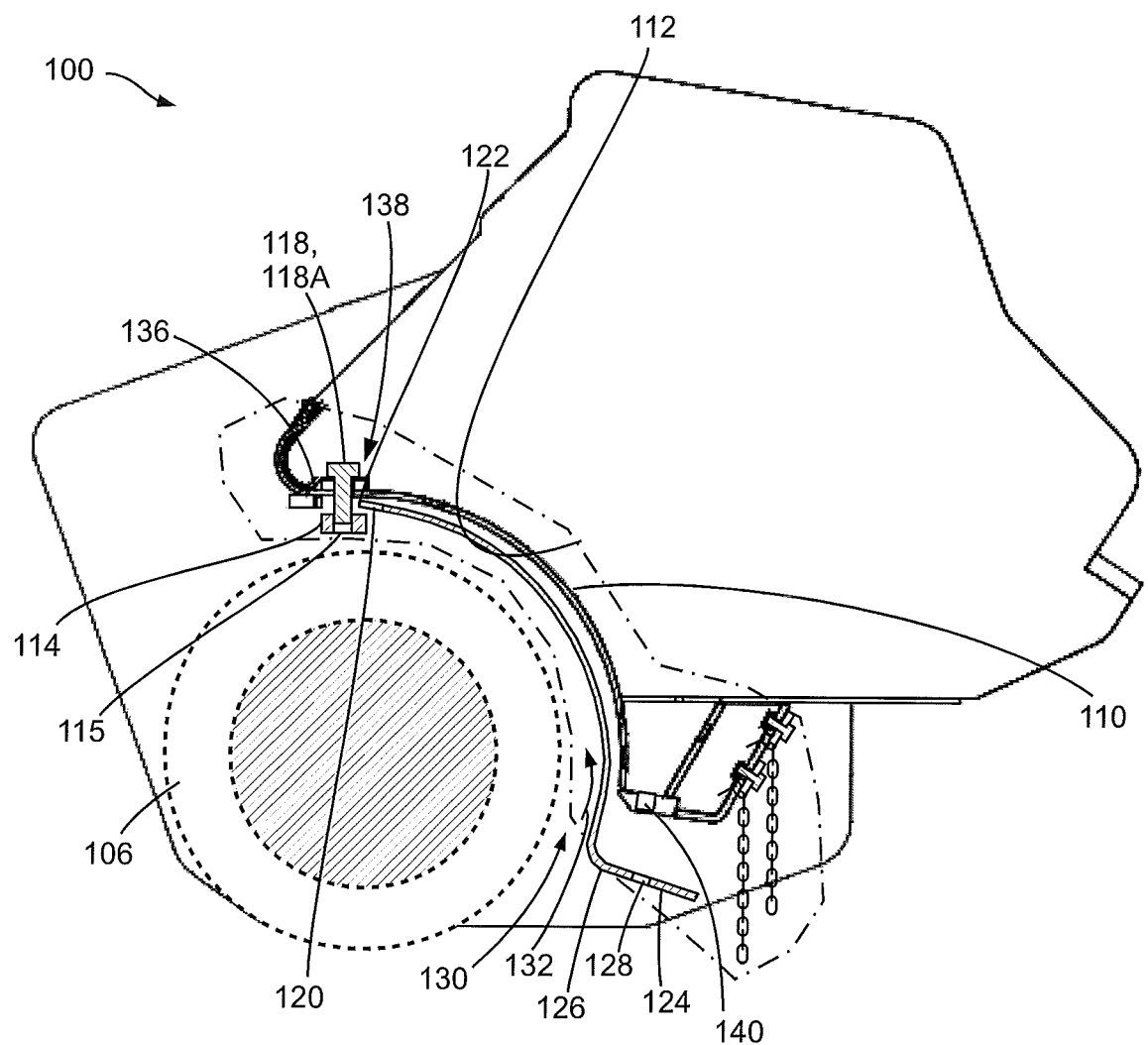
Figure 5C:
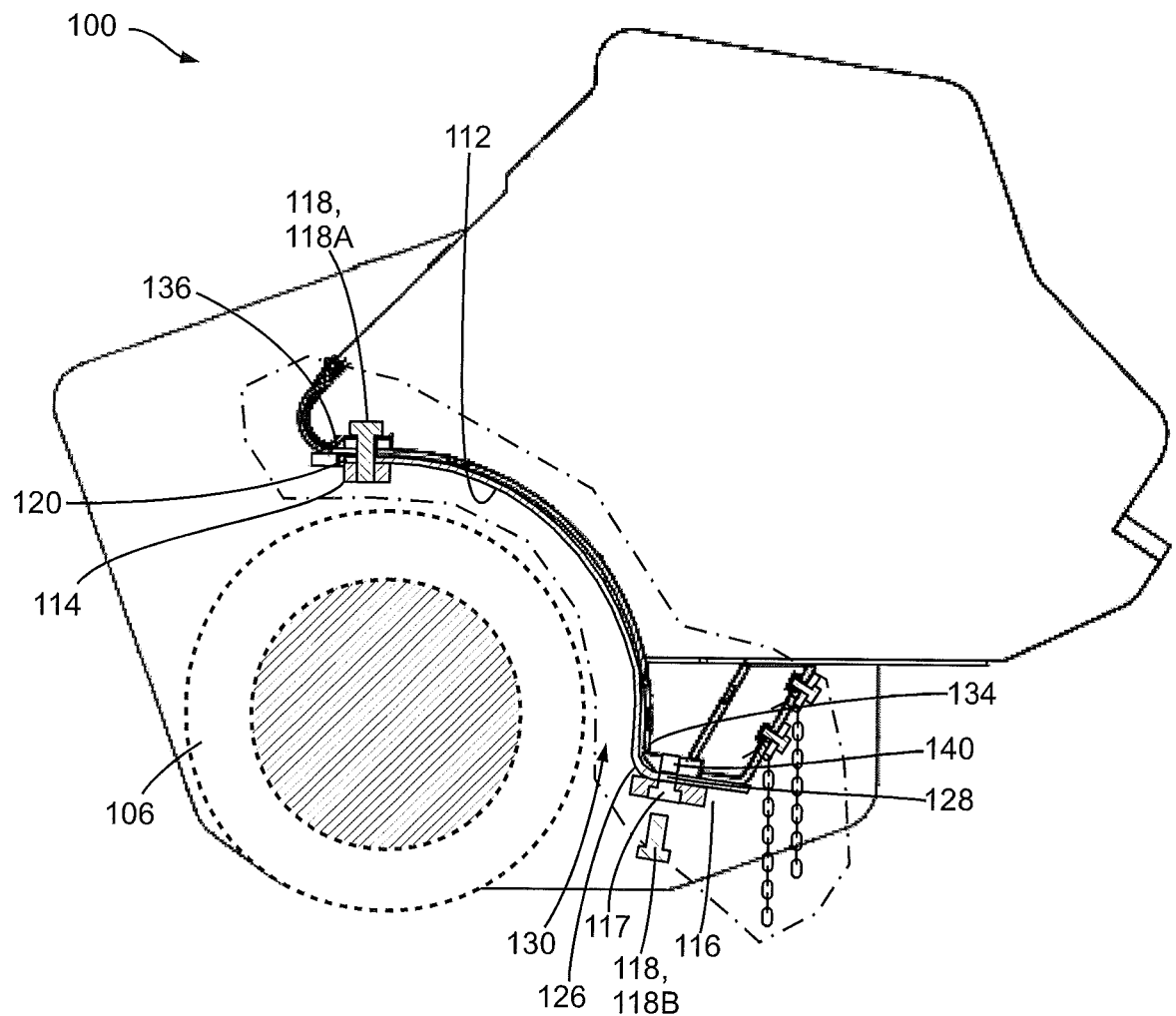

With this configuration, the wear liner 112 is configured to be installed to and removed from the mulching apparatus 100 without the need for removing the rotor 106 or the supports for the rotor 106. FIGS. 5A to 5C illustrate a process of installing the wear liner 112 to the mulching apparatus 100.

Referring to FIG. 2 and as shown in additional detail in FIGS. 5A to 5C, the bolts 118A supporting the upper plate 114 are loosened and the bolts 118B supporting the lower plate 116 are removed, along with the lower plate 116. Either before or after this step, the mulching apparatus 100 may be lifted in the air, rolled forward or the like to expose the base of the opening. The upper edge 122 of the wear liner 112 is then inserted into a gap 130 between the rotor 106 and the inner wall 110.

As shown in FIG. 5B, the wear liner 112 is then rotated into the gap between the rotor 106 and inner wall 110 as indicated by the arrow 132 until the upper edge 122 of the wear liner is inserted between the inner wall 110 and the upper plate 114. In the case where the wear liner 112 includes slots 120 at the upper edge 122, the slots 120 are configured to engage with the bolts 118A for the upper plate 114 so that the wear liner 112 can slide further into the gap between the inner wall 110 and the upper plate 114. The slots 120 of the wear liner 112 and the fastening holes 115 of the upper plate 114 are aligned with the fastening holes 138 on the inner wall 110 about an upper edge 136 thereof. As noted above, the upper plate 114 may be supported relative to the inner wall 110 by various fastening mechanisms which can be loosened and tightened to accommodate the wear liner 112.

As shown in FIG. 5B, the lower edge 126 (with flange 124) of the wear liner 112 rotates up as the wear liner moves into the gap 130. As shown in FIG. 5C, the lower edge 126 (with flange 124) then abuts against a lower edge 134 of the inner wall 110. The fastening holes 128 of the flange 124 and the fastening holes 117 of the lower plate 116 are aligned with the fastening holes 140 on the inner wall 110 about the lower edge 134 thereof. The wear liner 112 is then secured to the inner wall 110 using the bolts 118B extending through the aligned fastening holes 128, 117, and 140 (see FIG. 5A), and by tightening the bolts 118A to hold the wear liner 112 between the upper plate 114 and inner wall 110. Again, as noted above, other suitable fastening mechanisms could also be used to attach the wear liner 112 to the lower edge 134 of the inner wall 110.

When the wear liner 112 is worn and needs to be replaced, the wear liner 112 may be removed from the mulching apparatus 100 in a reversed process by (i) loosening the bolts 118A from the upper plate 114 to allow the wear liner 112 to be able to slide from between the upper plate 114 and the inner wall 110; (ii) removing the bolts 118B and the lower plate 116, and (iii) sliding the wear liner 112 away from the upper plate 114 and rotating the wear liner 112 out from the gap 130 between the rotor 106 and the inner wall 110.

The wear liner 112 has various advantages, including being both removable and serviceable with common tools such as wrenches and the like. The wear liner 112 may be installed to and removed from the mulching apparatus 100 without the need of removing the rotor 106 or other major parts. Therefore, the wear liner 112 may be more easily serviced in the field with reduced/minimal downtime as compared to conventional mulching apparatuses.

It will be understood that in various embodiments, the wear liner 112 may not have slots 120 at the top edge 122 thereof; the wear liner 112 may not require a flange 124 (for example, it could be attached to the inner wall 110 at a different point, for example higher on the inner wall 110), the mulching apparatus 100 and wear liner 112 may be configured to be inserted from above the rotor 106 rather than below, and various other arrangements that may be apparent based on the teachings herein.

Figure 6A:
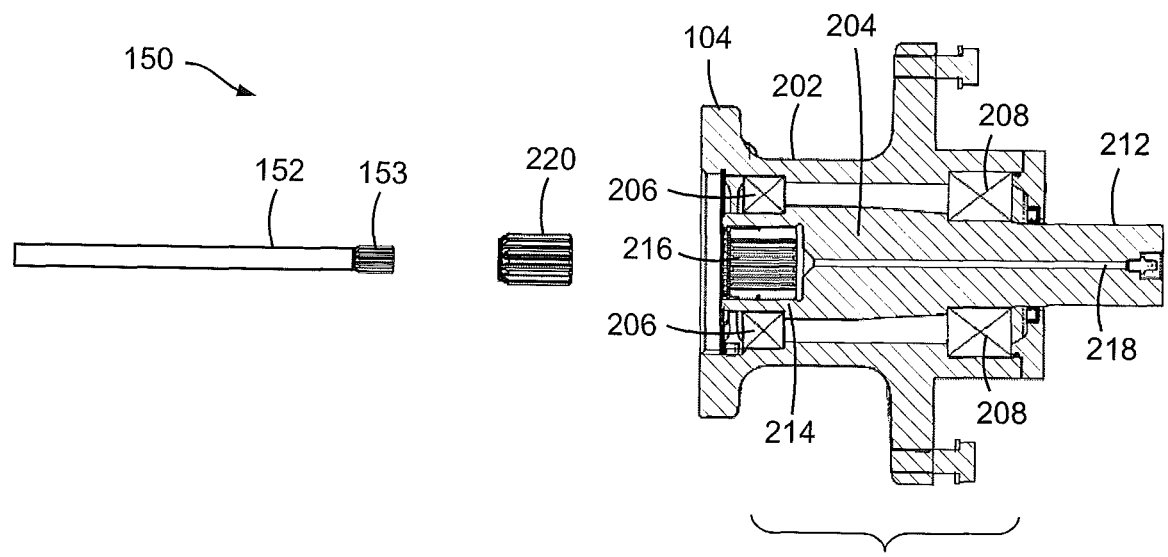
FIGS. 6A and 6B are cross-sectional views of a drive train of the mulching apparatus of FIG. 1.
Figure 6B:
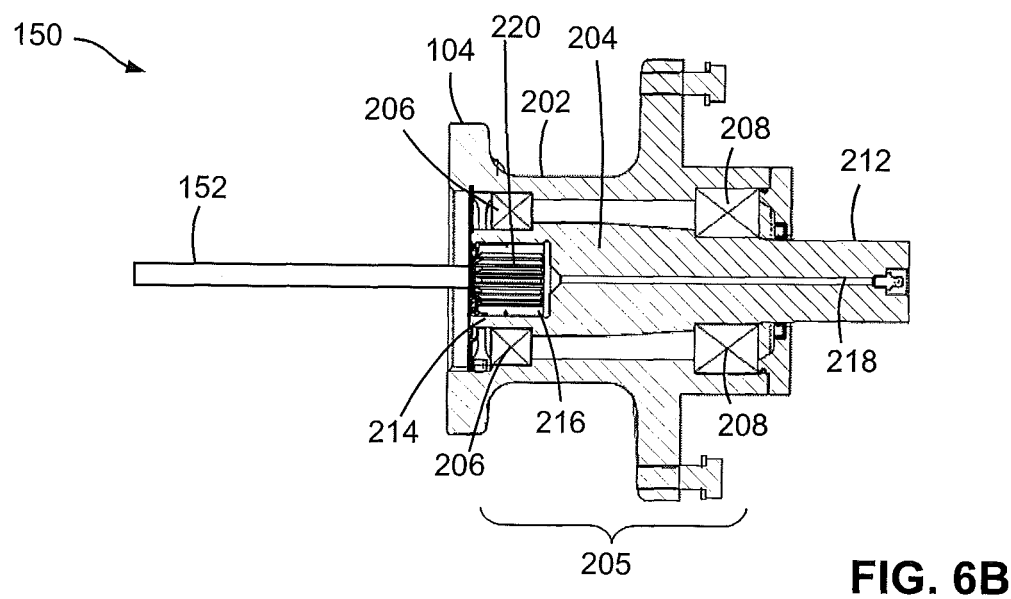
Figure 6C:
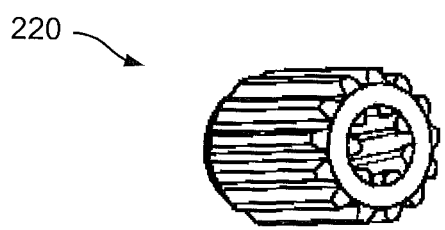
FIG. 6C is a perspective view of a wear gear of the drive train of FIGS. 6A and 6B.

As illustrated in FIGS. 6A and 6B, the mulching apparatus 100 includes at least one drive train 150 for driving the rotor 106. The drive train 150 includes a motor (not shown) having a motor shaft 152 and a drive shaft 204. The drive shaft 204 is supported by a bearing housing 202, including a bearing system 205, which, in this case, includes first and second bearings 206 and 208.

The drive shaft 204 is connected to the motor shaft 152 by a wear gear 220 that is configured to provide a connection between the motor shaft 152 and the drive shaft 204. In particular, the wear gear 220 comprises a spline/gear profile on an inner or outer surface thereof for engaging a gear housing 216 of the drive shaft 204, and also comprises a spline/gear profile on the other of the inner or outer surface thereof for engaging a gear profile 153 of the motor shaft 152.

The wear gear 220 has a softer hardness comparing to the motor shaft 152 and the drive shaft 204 and is configured to be a sacrificial, replaceable component for protecting the integrity of the motor shaft 152 and the drive shaft 204. In operation, the wear gear 220 transmits power from the motor shaft 152 to the drive shaft 204 and also acts as a wear medium for absorbing shocks and preventing wear and/or tear that might otherwise damage the motor shaft 152 and the drive shaft 204. When the wear gear 220 is worn or damaged, an operator may relatively easily remove the wear gear 220 by separating the motor from the bearing housing, removing the old wear gear and inserting a new wear gear. Replacement of the wear gear is less expensive than replacing either the motor shaft 152 or the drive shaft 204 and can be more easily done in a remote environment and/or with limited resources. It will be understood that the wear gear 220 is shown with a spline arrangement but could also be configured for keyed shafts and connectors or other connection systems. For example, in some embodiments, the wear gear 220 may comprise a bore having a keyed profile for coupling to a motor shaft 152 having a matched keyed profile on a coupling end thereof.

The drive shaft 204 is provided with a longitudinal bore 218 extending along the axis of the drive shaft 204 from a proximal end 212 thereof to the spline housing 216 for the wear gear 220, thereby forming a grease path for servicing or lubricating the gear connections including the gear profile 153 of the motor shaft 152, the wear gear 220, and the gear housing 216. The bearing housing 202 may further comprise a purge/relief port (not shown) in fluid communication with the grease path 218 for reducing the risk of over-pressurizing the gear housing 216 and causing damage to the hydraulic motor shaft seal. In some embodiments, the purge/relief port may be a dedicated port relief.

As shown in FIG. 1, the rotor 106 includes a generally cylindrical rotor body provided with a plurality of tooth assemblies 108 arranged in a predetermined pattern with strike faces thereof facing the spin or rotation direction of the rotor 106.

Figure 7A:
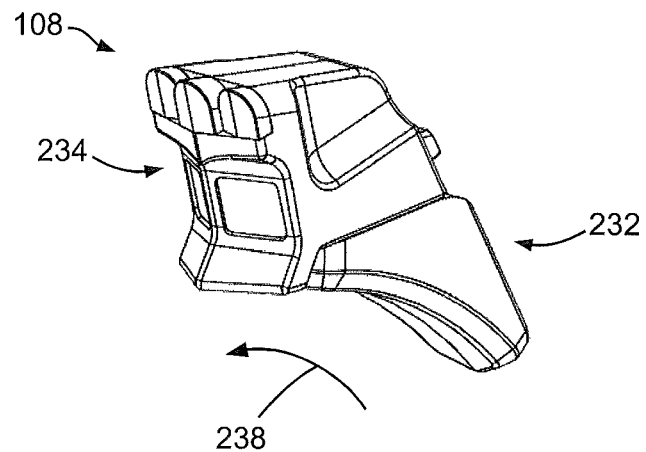
FIGS. 7A and 7B are front and rear perspective views of a tooth assembly of a rotor of the mulching apparatus shown in FIG. 1, according to an embodiment herein.
Figure 7B:
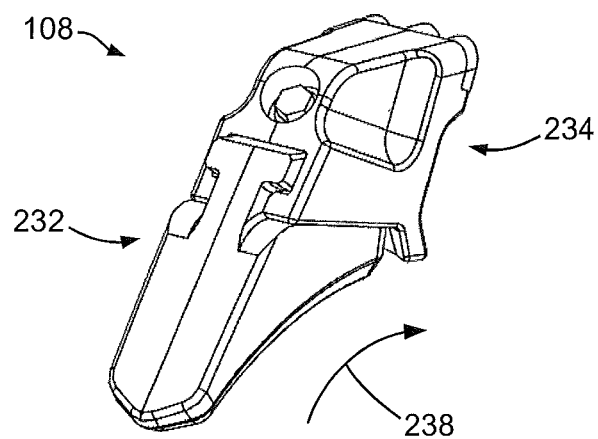

As shown in FIGS. 7A and 7B, each tooth assembly 108 comprises a tooth mount 232 configured to be coupled to the rotor body and a tooth 234 configured to be demountably coupled to the tooth mount 232. In the following description of the structures of the tooth mount 232 and the tooth 234, the direction-indication terms such as "forward", "rearward", "front", "rear", "back", and the like, are with respect to the spin direction 238 of the rotor 106; the term "longitudinal" refers to a direction parallel or tangential to the spin direction 238; and the term "lateral" refers to a direction perpendicular to the spin direction 238.

FIGS. 8A to 8E show a tooth mount 232 according to some embodiments. As shown, the tooth mount 232 includes a top surface 242 and a bottom mounting-surface 244. The tooth mount 232 includes two outwardly facing grooves 246 rearwardly extending on laterally opposite sidewalls 248 of the tooth mount 232 from a front side thereof and two outwardly facing ridges 250 above the two outwardly facing grooves 246 that form a T-shaped connector for the tooth mount 232. The tooth mount 232 also includes a retaining recess 252 on the top surface 242.

The bottom mounting-surface 244 has a profile or shape substantially matching that of the rotor body for coupling the tooth mount 232 thereto using suitable means such as welding, bolting, and/or the like. Alternatively, the tooth mount 232 may be machined into or otherwise integrated with the rotor body as protrusion extensions.

Figure 8A:
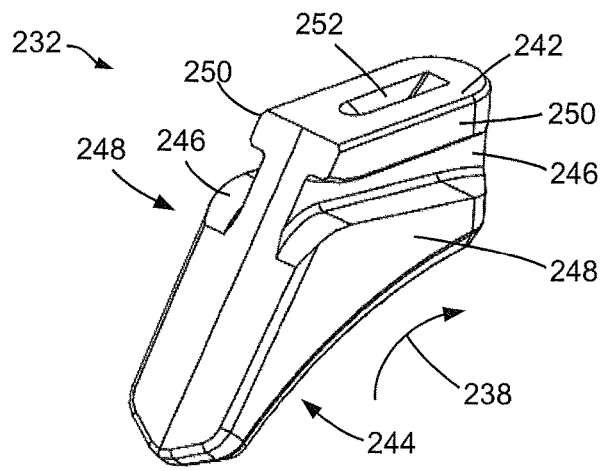
Figure 8B:
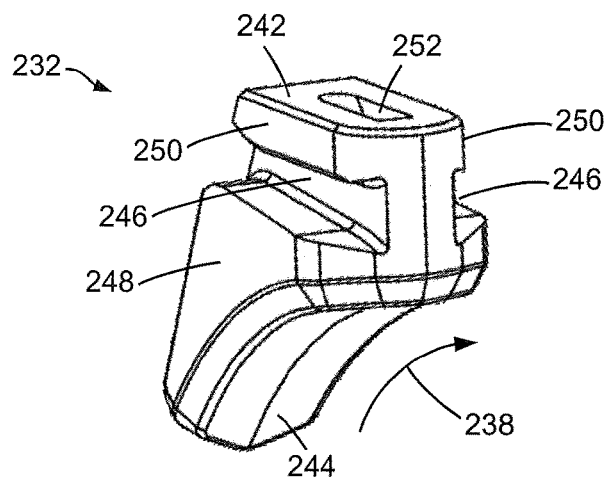
Figure 8C:
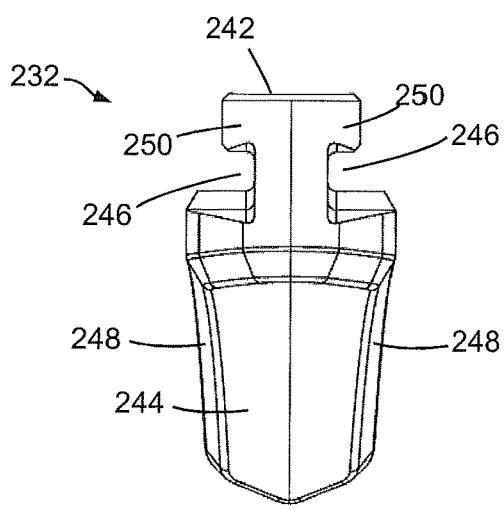
Figure 8D:
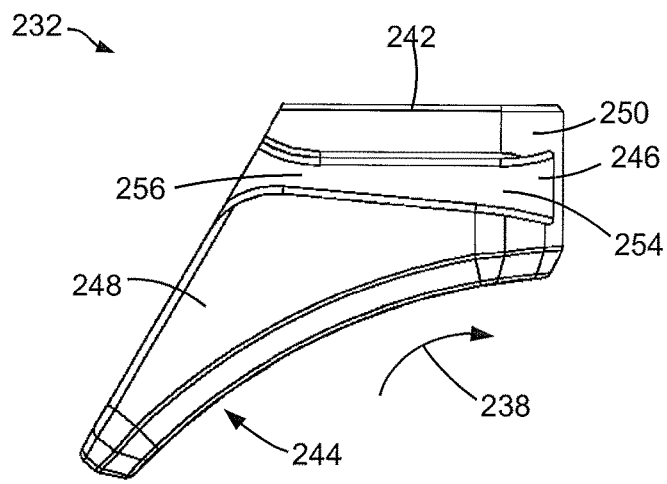

As shown in FIG. 8D, each outwardly facing groove 246 has a wedge shape with a width tapering from a front side 254 to a rear side 256 thereof. As will be described in more detail later, such a wedge shape enhances the coupling between the tooth mount 232 and the tooth 234 during operation. In some cases, the wedge shape is formed by a taper in a lower wall of the ridges 250 or in a lower wall of the grooves 246, or both. In this particular example, the wedge shape is formed by tapering/angling the lower wall of the grooves 246.

Figure 8E:
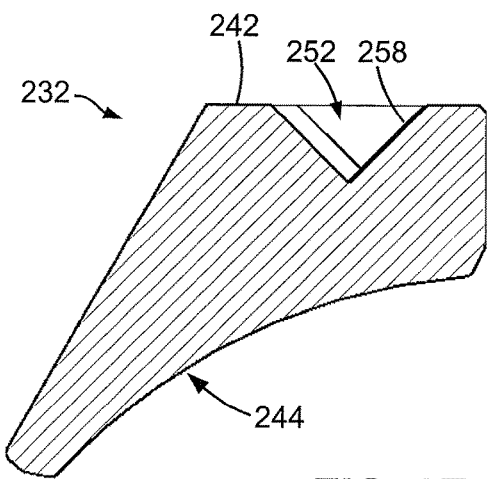

As shown in FIG. 8E, the retaining recess 252 comprises an upwardly and rearwardly facing surface 258 engageable with a coupling component such as a bolt extending through a corresponding tooth 234 for retaining the tooth 234 on the tooth mount 232 (described further below).

Figure 9A:
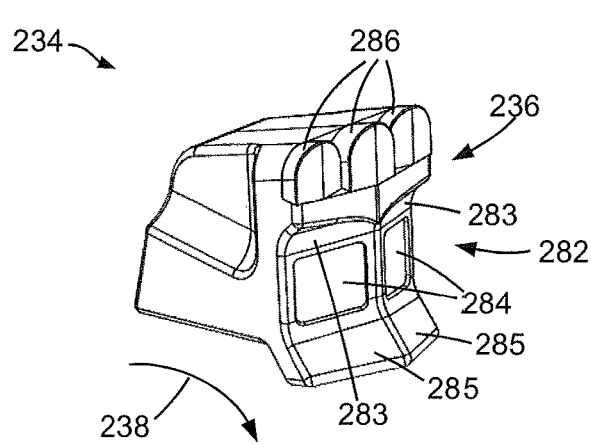
Figure 9B:
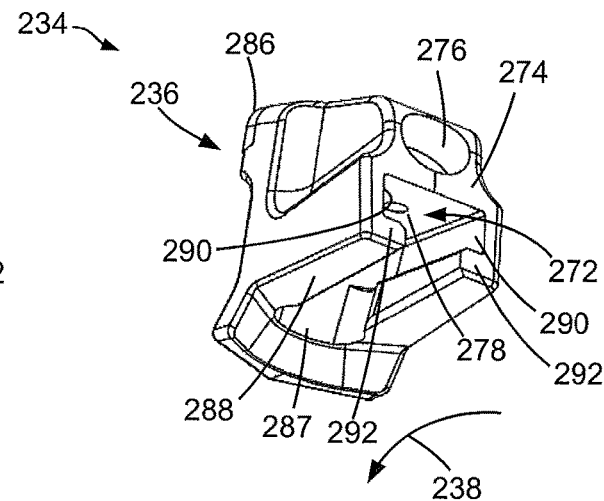
Figure 9C:
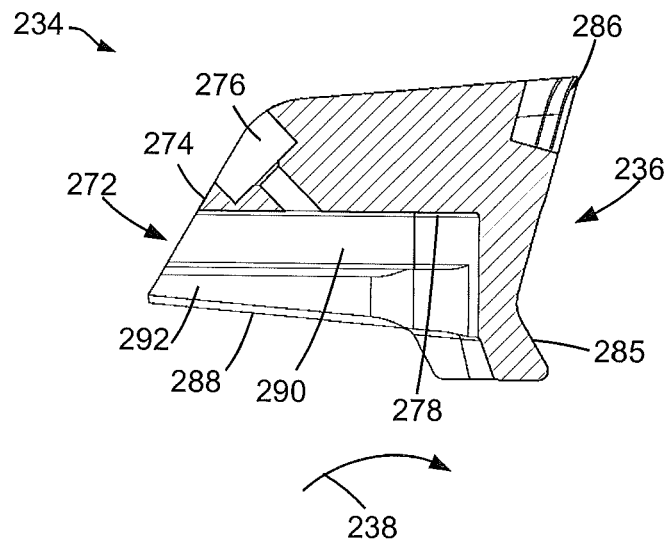

FIGS. 9A to 9C show a corresponding tooth 234 mountable to the tooth mount 232. As shown, the tooth 234 comprises a front strike face 236 facing the spin direction 238, a mounting slot 272 forwardly extending into the tooth 234 from a rear surface 274 thereof, and a fastening hole 276 extending from the rear surface 274 thereof toward the top wall 278 of the mounting slot 272 at a predetermined angle.

In these embodiments, the front strike face 236 includes a plurality of bite tips 286 at a top front thereof, typically made of a hardened material such as carbide. The front strike face 236 also comprises a generally plow-shaped configuration 282 below the bite tips 286. In this embodiment, the plow-shaped configuration comprises a rear curvature 283 toward the rear of the tooth 234 and a forward curvature 285 toward the front of the tooth 234 at a base of the strike face 236. In particular, the forward curvature 285 extends below the bottom surface 288 of the tooth 234. In some cases, the front strike face 236 may also include one or more bite plates 284 of hardened material such as carbide.

The provision of a plurality of bite tips 286, in this case, three, but generally more than two, allows the bite tips 286 to be stronger and generally last longer than a larger sized bite tip such as those used in single or double bite tip configurations. For example, in larger carbide materials/elements, the interior of the material/element can be softer than the exterior of the materials and, as such, the life of a larger carbide material/element may be shorter. The use of a larger number of bite tips 286 can also allow for wider teeth and allows the tooth to continue with some mulching even if one of the bite tips 286 is broken.

The provision of a plow-shape configuration at the front strike face helps direct material around the tooth and, in particular, the forward curvature 285 helps protect the tooth mount 232 from contact with material being mulched. In some embodiments, the plow-shape configuration may include only one or the other of the rear curvature and the forward curvature.

As shown in FIG. 9B, the tooth 234 also includes a relief area 287 at a forward end of the mounting slot 272. The relief area 287 is an opening of the mounting slot 272 in a circular shape that is intended to allow clearance and relieve stress when the tooth 234 is pushed against the tooth mount 232.

In these embodiments, the mounting slot 272 is also open to the bottom surface 288 with a cross section smaller than that of an upper portion thereof, thereby forming an inwardly facing groove 290 and an inwardly facing ridge 292 thereunder on each sidewall of the mounting slot 272 that conform with the T-shaped connector of the tooth mount 232. As shown in FIG. 9C, each inwardly facing ridge 292 has a wedged shape with a width or thickness tapering from a front side to a rear side thereof and is engagable with the outwardly facing grooves 246 of the tooth mount 232.

In these embodiments, the fastening hole 276 extends from the rear surface 274 of the tooth 234 to the top wall 278 of the mounting slot 272 at a suitable angle such that the fastening hole 276 is substantially perpendicular to the sloped locking-surface 258 of the tooth mount 232 when the tooth 234 is coupled to the tooth mount 232.

Figure 10:
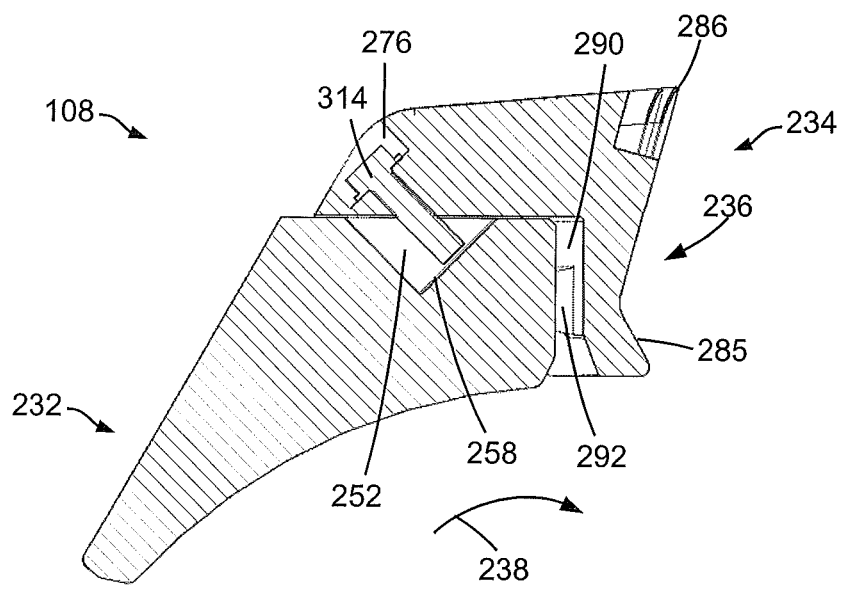
FIG. 10 is a cross-sectional view of the tooth assembly of FIG. 7A including the tooth shown in FIG. 9A and the tooth mount shown in FIG. 8A.

To mount a tooth 234 onto a tooth mount 232 to form a tooth assembly 108, the tooth 234 is slid onto the tooth mount 232 from the front side of the tooth mount 232 such that the outwardly facing grooves 246 of the tooth mount 232 respectively engage the inwardly facing ridges 292 of the tooth 234, and the outwardly facing ridges 250 of the tooth mount 232 respectively engage the inwardly facing grooves 290 of the tooth 234. As noted, this configuration is sometimes referred to as a "T" connection. A bolt 314 is then inserted through the fastening hole 276 of the tooth 234 and enters the retaining recess 252 of the tooth mount 232. A cross section of the assembled tooth assembly 108 is shown in FIG. 10. As can be seen in FIG. 10, the length of the bolt 314 is configured such that the bolt 314 will only contact the wall 258 of the retaining recess 252 if the tooth 234 becomes loose and slides forward relative to the tooth mount 232. This configuration is intended to prevent the tooth 232 from falling off of the tooth mount 234 while also reducing the chances of the bolt 314 becoming loose due to vibration during operation.

In some embodiments, the exterior design of the tooth 234 and tooth mount 232 may also be tapered from front to back. This is intended to allow material to flow past the teeth assemblies once mulched.

Figure 11:
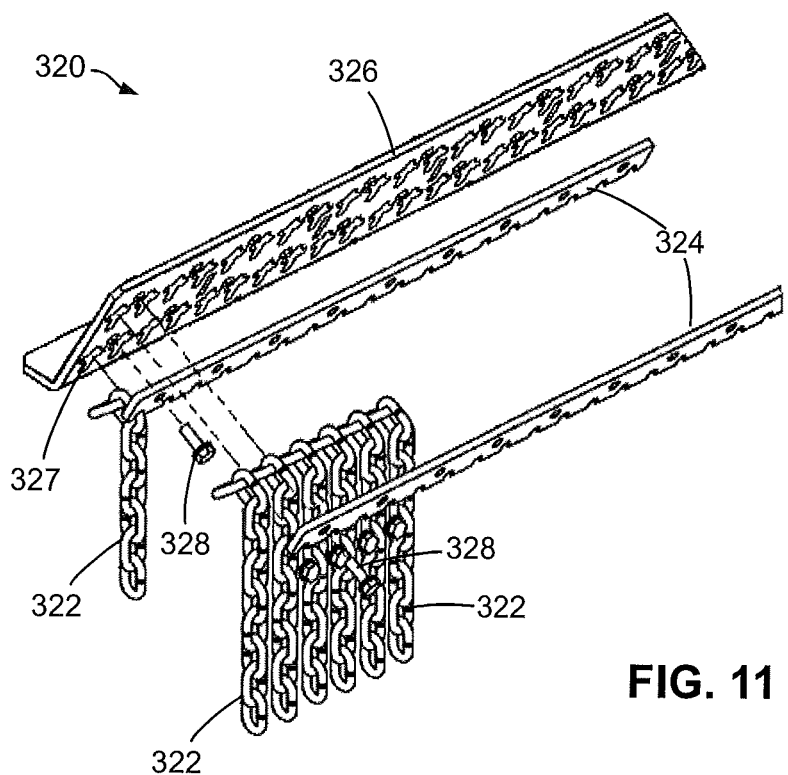
FIG. 11 is a perspective view of a chain assembly according to an embodiment herein.

Referring again to FIG. 2, the mulching apparatus 100 also comprises a chain assembly 320 configured to reduce or prevent debris from flying backwardly out of the mulching apparatus 100. As shown in additional detail in FIG. 11, the chain assembly 320 comprises a plurality of chains 322 individually mounted to a mounting plate 326 by inserting or connecting an upper end of each chain into a chain holder 327, in this particular case, a support hole 327, on the mounting plate 326. The support hole 327 is configured such that the chain can be inserted into and moved into an upper part of the support hole 327 and then lowered into a lower part of the support hole 327 where the chain will be held in place. As shown, one link of the chain 322 is moved through the upper part of the support hole 327 and a second link of the chain 322 is lowered into the lower part of the support hole 327 such that the chain 322 is supported in place. This configuration is sometimes called a banjo eye fitting. The chain holder 327 may have other configurations, for example, individual pegs on which each chain 322 may be hung or the like. The chains are then further held in place by one or more chain support bars 324, which are removably attached to the mounting plate 326 such that the chains 322 are supported against the mounting plate 326. The chain support bar or bars 324 may be attached to the mounting plate by a fastening mechanism 328, in this case bolts 328, but could also be clamps, removable/breakable welding, tapered dowel pins, shims or the like. An advantage of the chain assembly 320 is that a worn-out or broken chain 322 may be more easily individually replaced by removing or losing the chain support bar 324 (or in some cases, just a section of chain support bar 324) and removing and replacing only the worn-out chain 322. Conventional chain assemblies would generally require the removal of all of the chains from a rod that supported all of the chains.

Figure 12A:
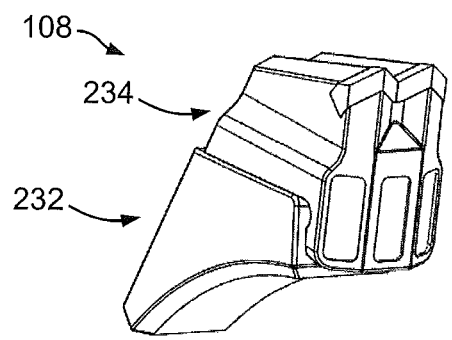
FIGS. 12A and 12B are front and rear perspective views of a tooth assembly of a rotor of the mulching apparatus shown in FIG. 1, according to an alternative embodiment herein.
Figure 12B:
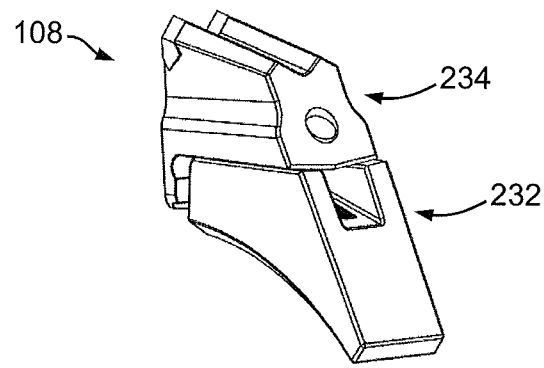

FIGS. 12A and 12B show a tooth assembly 108 according to an alternative embodiment. Similar to the tooth assembly shown in FIGS. 7A and 7B, the tooth assembly 108 in this embodiment comprises a tooth mount 232 and a tooth 234.

FIGS. 13A to 13D show the tooth mount 232. As shown, the tooth mount 232 comprises a top surface 342, a curved bottom mounting-surface 344, a mounting slot 346 rearwardly extending into the tooth mount 232 from a front surface 348 thereof, and a retaining recess 350 rearward to the mounting slot 346.

The top surface 342 comprises two surface portions 342A and 342B that help define a mounting slot 346 that rearwardly extends into the tooth mount 232 from the front surface 348 thereof. The mounting slot 346 is open between surface portion 342A and 342B with a cross section smaller than that of a lower portion thereof, thereby forming an inwardly facing groove 354 and an inwardly facing ridge 356 thereabove on each sidewall of the mounting slot 346. This arrangement is similar to the T-connector of the embodiment of the tooth assembly described above but in this case, the T is on the tooth and the mounting slot is on the tooth mount. The T-connector facilitates the alignment of the tooth 234 with the tooth mount 232 and helps to prevent the tooth 234 from lateral movement or rotation during mulching operation.

The curved bottom mounting-surface 344 has a curvature substantially matching that of the surface of the rotor body for coupling the tooth mount 232 to the rotor body using suitable means such as welding, bolting, and/or the like.

Figure 13A:
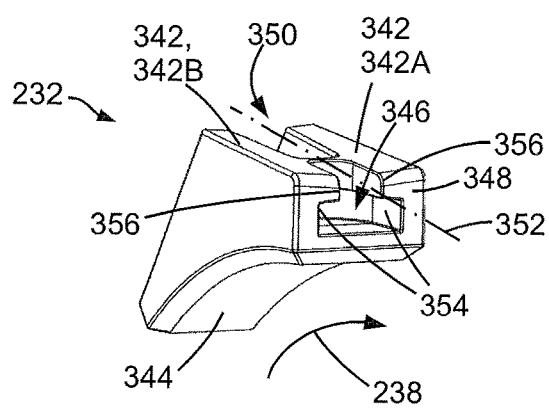
Figure 13B:
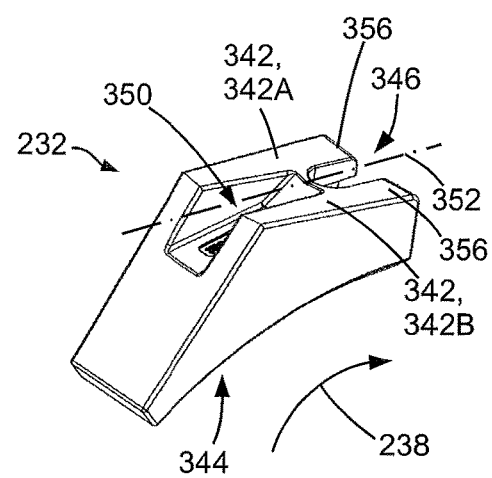
Figure 13C:
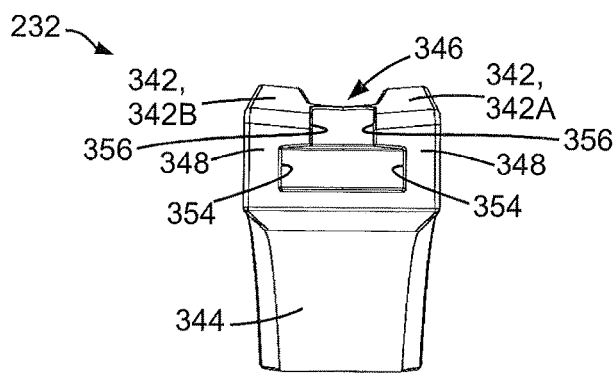
Figure 13D:
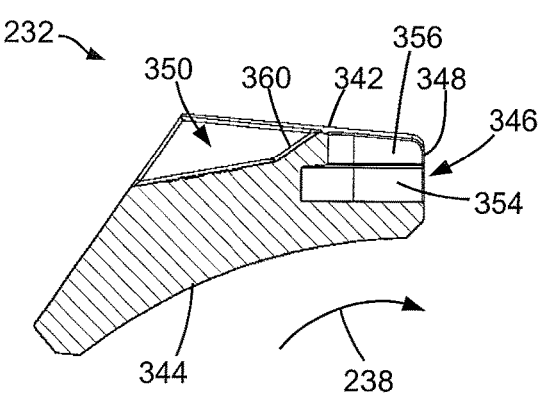

As shown in FIG. 13D, the retaining recess 350 comprises an upwardly and rearwardly facing surface 360 engagable with a bolt extending through the tooth 234 for preventing the tooth 234 from sliding off the tooth mount 232 (described later).

As shown in FIGS. 14A to 14F, the tooth 234 comprises a front strike face 236 facing the spin direction 238, two outwardly facing ridges 372 rearward to the strike face 236 and under a bottom surface 374 of the tooth 234, and a fastening hole 376 extending from a rear surface 378 of the tooth 234 to the bottom surface 374 at a predetermined angle.

The front strike face 236 is hardened and shaped for striking various materials. In these embodiments, the strike face 236 comprises a central portion 382 and two slightly rearwardly extending side-portions 384. The front strike face 236 may include bite tips 386 and/or bite plates 387 of hardened material such as carbide.

The two outwardly facing ridges 372 form the T of the T-connector and are engagable with the two inwardly facing grooves 354 of the tooth mount 232. In particular, a gap between each outwardly facing ridge 372 and the bottom surface 374 forms an outwardly facing groove 394 engagable with a respective one of the two inwardly facing ridges 356 of the tooth mount 232.

The bottom surface 374 includes two surface portions 374A and 374B laterally slopped outwardly about a longitudinal centre-line 396 of the tooth 234 with a slope angle substantially matching that of sloped portions 342A and 342B of the tooth mount 232.

Figure 14A:
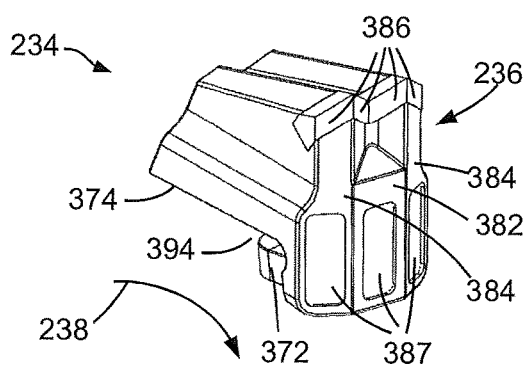
Figure 14B:
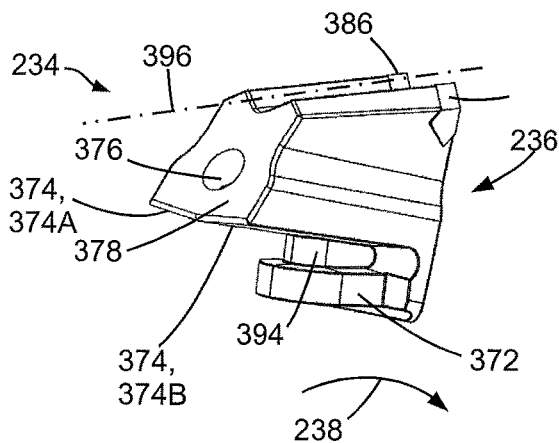
Figure 14C:
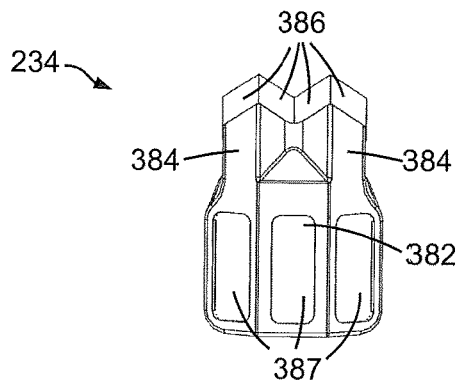
Figure 14D:
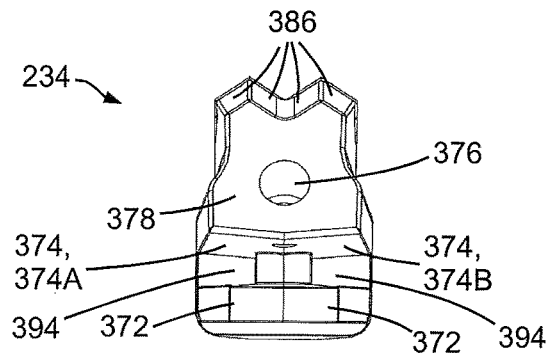
Figure 14E:
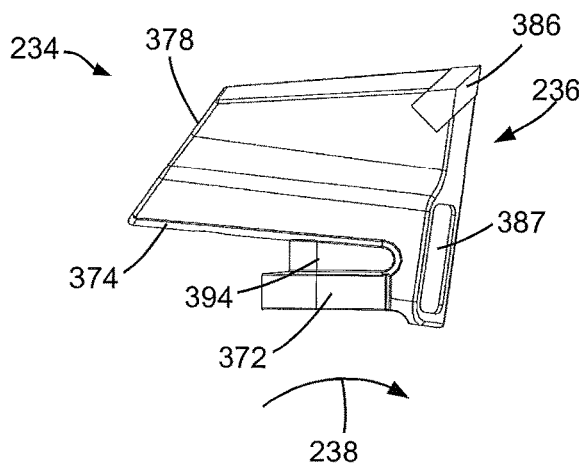
Figure 14F:
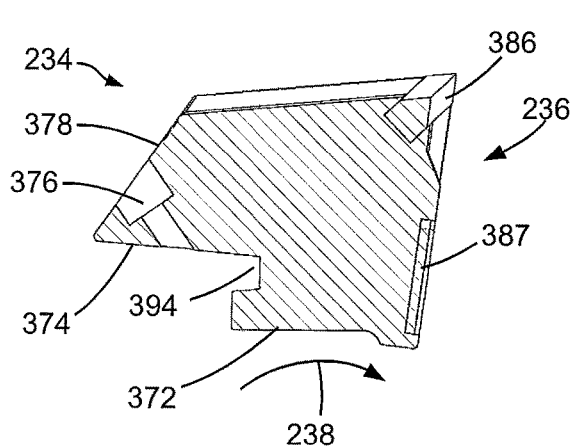

As shown in FIG. 14F, the fastening hole 376 extends from the rear surface 378 of the tooth 234 to the bottom surface 374 at a suitable angle such that the fastening hole 376 is substantially perpendicular to the sloped surface 360 of the tooth mount 232 when the tooth 234 is coupled to the tooth mount 232.

Figure 15A:
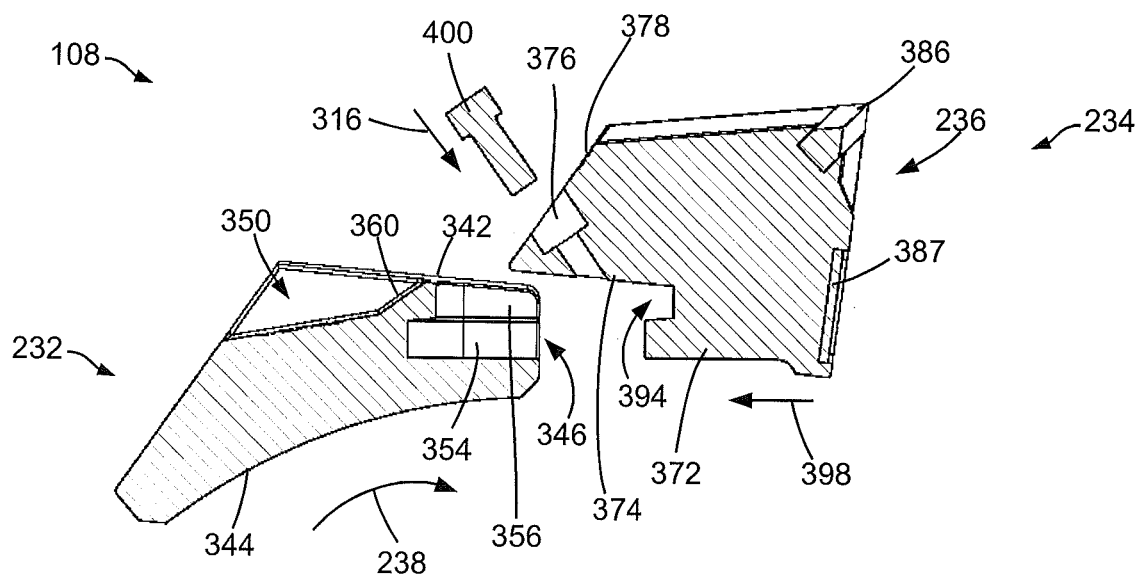
FIG. 15A is a cross-sectional view of the tooth assembly of FIG. 12A, including the tooth shown in FIG. 14A and the tooth mount shown in FIG. 13A, before the tooth is coupled to the tooth mount.
Figure 15B:
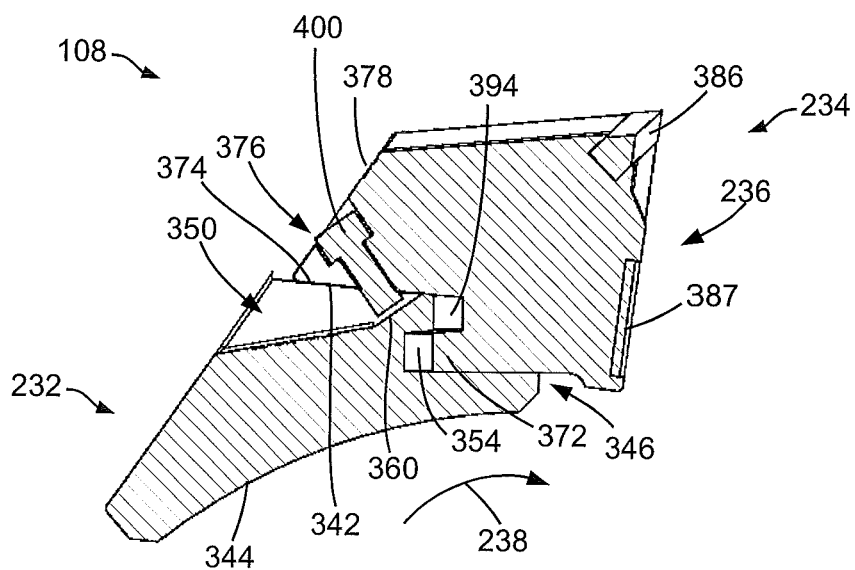
FIG. 15B is a cross-sectional view of the assembled tooth assembly of FIG. 12A.
Figure 15C:
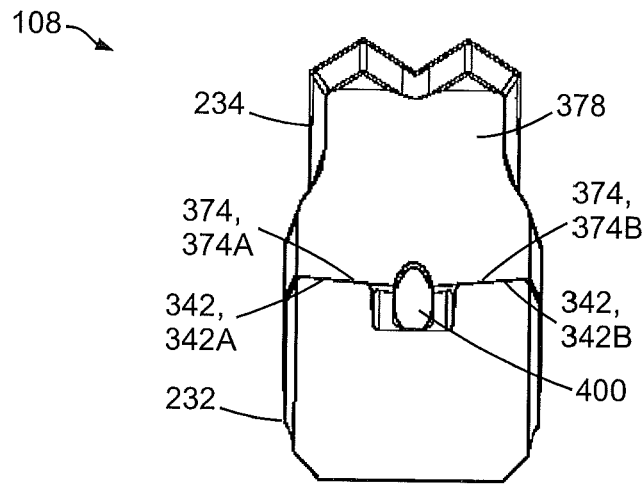
FIG. 15C is a rear view of the assembled tooth assembly of FIG. 12A.

FIGS. 15A and 15B are cross-sectional views of the tooth assembly 108 showing a process of coupling and securing the tooth 234 onto the tooth mount 232. As shown, the tooth 234 is first slid onto the tooth mount 232 from the front side thereof as indicated by the arrow 398, by inserting or wedging the two outwardly facing ridges 372 of the tooth 234 into the mounting slot 346 of the tooth mount 232. The two inwardly facing grooves 354 of the mounting slot 346 then respectively engage the two outwardly facing ridges 372 of the tooth 234 and the two inwardly facing ridges 356 of the mounting slot 274 respectively engage the two outwardly facing grooves 394 of the tooth 234.

Referring again to FIG. 15A, after the tooth 234 is coupled to the tooth mount 232, a component 400 such as a bolt, a stick, a rod, a pin, or the like, is removably inserted through the fastening holes 376 of the tooth 234 and enters the retaining recess 350 of the tooth mount 232 to reduce the chance of the tooth 234 being dislodged from the mounting slot 346 from the front side thereof. As can be seen in FIG. 15B, the length of the bolt 400 is configured such that the bolt 400 will only contact the wall 360 of the retaining recess 350 if the tooth 234 becomes loose and slides forward.

As with the embodiment above, the tooth assembly 108 is configured such that material impacting the strike face 236 of the tooth 234 forces the tooth 234 further or tighter into the mounting slot 346.

When a tooth 234 needs to be replaced, the bolt 400 is removed from the tooth assembly 108, and then a hammer or a similar tool can be used to knock the rear surface 378 of the tooth 234 to dislodge the tooth 234 from the tooth mount 232.

In the above embodiments, the ridges and grooves on the tooth mount 234 and the tooth 232 are generally shown with laterally leveled upper and lower surfaces, i.e., such surfaces are extending laterally horizontally.

In some alternative embodiments as shown in FIGS. 16A to 16D, some of the surfaces of the ridges and grooves on the tooth mount 234 and the tooth 232 may be sloped.

Figure 16A:
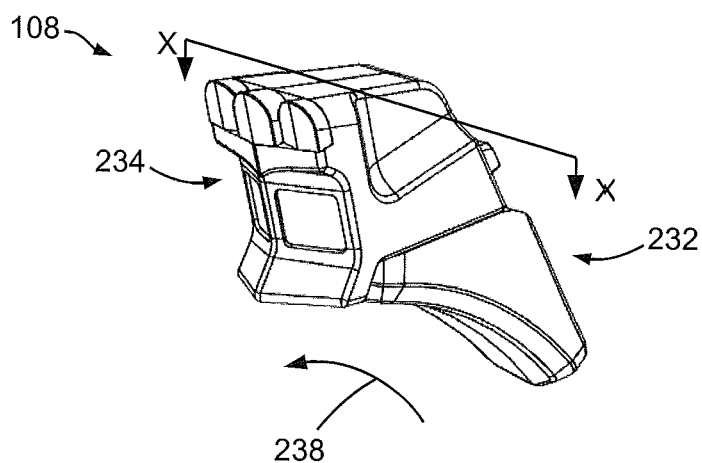
FIG. 16A is a perspective view of another embodiment of a tooth assembly.
Figure 16B:
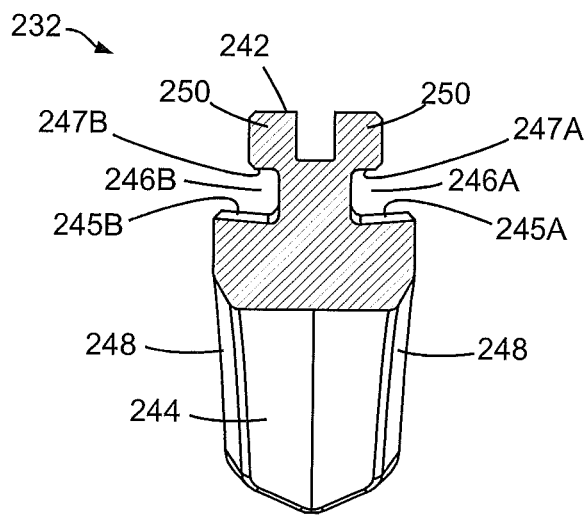
FIG. 16B is a cross-sectional view of a tooth mount of the tooth assembly shown in FIG. 16A.
Figure 16C:
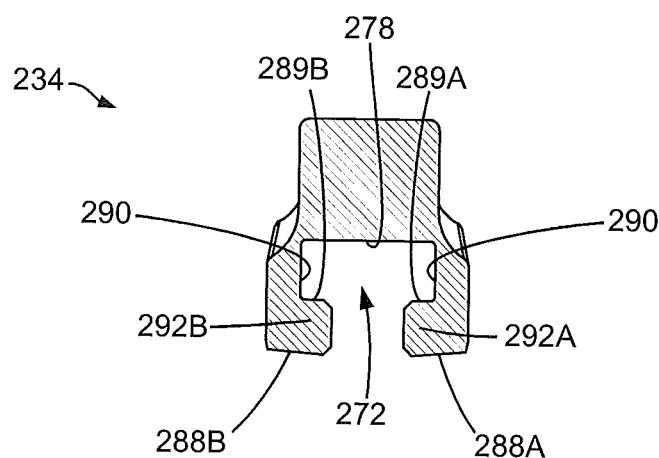
FIG. 16C is a cross-sectional view of a tooth of the tooth assembly shown in FIG. 16A.
Figure 16D:
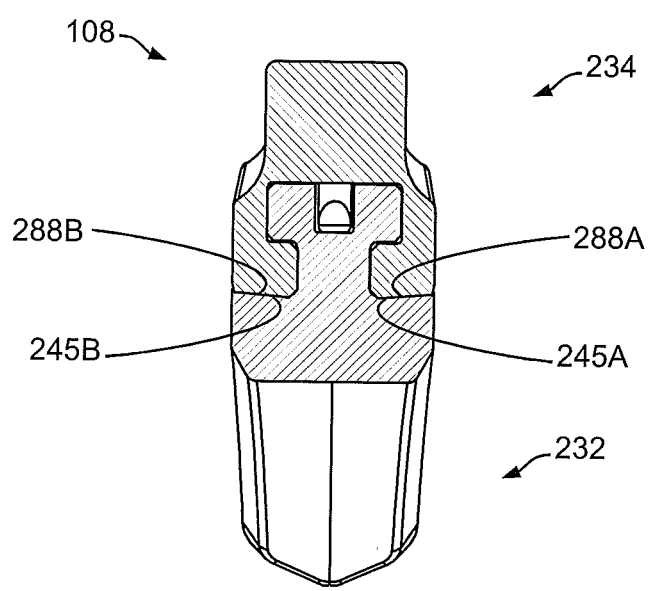
FIG. 16D is a cross-sectional view of the tooth assembly shown in FIG. 16A.

FIG. 16A is a perspective view of a tooth assembly 108 in these embodiments, wherein the tooth assembly 108 comprises a tooth mount 232 and a tooth 234. FIG. 16B, 16C, and 16D are cross-sectional views of the tooth mount 232, the tooth 234, and the tooth assembly 108 along the cross-section line X-X shown in FIG. 16A.

As shown in FIG. 16B, the tooth mount 232 is similar to that shown in FIGS. 8A to 8E, and comprises outwardly extending grooves 246A and 246B, each of which comprises an upper surface 247A, 247B, and a lower surface 245A, 245B. In these embodiments, the upper surfaces 247A and 247B are laterally leveled. However, the lower surfaces 245A and 245B are laterally sloped towards the center of the tooth mount 232 such that the lower surfaces 245A and 245B face upwardly and inwardly.

As shown in FIG. 16C, the tooth 234 is similar to that shown in FIGS. 9A to 9C, and comprises a pair of inwardly extending ridges 292A and 292B, each of which comprises an upper surface 289A, 289B, and a lower surface 288A, 288B. In these embodiments, the upper surfaces 289A and 289B are laterally leveled. However, the lower surfaces 288A and 288B are laterally sloped away from the center of the tooth 234 such that the lower surfaces 288A and 288B face downwardly and outwardly with a slope angle matching that of the lower surfaces 245A and 245B of the grooves 246A and 246B of the tooth mount 232.

As shown in FIG. 16D, after assembling, the lower surfaces 245A and 245B of the grooves 246A and 246B of the tooth mount 232 engage the lower surfaces 288A and 288B of the ridges 292A and 292B of the tooth 234.

As described herein, the grooves 246A and 246B of the tooth mount 232 and the ridges 292A and 292B of the tooth 234 are wedge shaped. During operation, the material impacting the strike face 236 of the tooth 234 forces the tooth 234 further or tighter into the mounting slot 346. When the tooth 234 is forced into the mounting slot 346, the sloped surfaces 245A and 245B of the tooth mount 232 generally apply an upward and inward force to the ridges 292A and 292B of the tooth 234 via the lower surfaces 288A and 288B thereof, thereby biasing the ridges 292A and 292B toward the center of the tooth assembly 108. This configuration are intended to assist with keeping the tooth 234 attached to the tooth mounting 232 even when subject to the forces of the mulching process. It will be understood that other surfaces, such as upper surfaces 289A, 289B and upper surfaces 247A, 247B or the like.

In some alternative embodiments, the drive train 150 may comprise one or more gears, belts or shafts and may be driven hydraulically, directly powered (such as by a power take-off (PTO) system), or by other suitable means from a power source such as a gas or diesel engine. In operation, the drive train 150 spins the rotor 106 and the teeth 234 of the rotor 106 engage the material and break the material into pieces.

Although in the above embodiments, the mulching apparatus 100 is in the form of a mulching attachment for attaching to a self-propelled device, in some alternative embodiments, the mulching apparatus 100 may be an apparatus independently operable without being attached to a self-propelled device. In some alternative embodiments, the mulching apparatus 100 may itself be a self-propelled device.

Although embodiments have been described above with reference to the accompanying drawings, those of skill in the art will appreciate that variations and modifications may be made without departing from the scope thereof as defined by the appended claims.

What is claimed is:

1. A mulching apparatus comprising:
   a housing comprising a front opening and an inner wall;
   a rotor mounted in the front opening of the housing adjacent to the inner wall;
   a replaceable wear liner configured to be installed to and removed from the mulching apparatus while the rotor remains mounted in the front housing; and
   a liner mounting system for mounting the replaceable wear liner between the rotor and the inner wall, the liner mounting system comprising:
   an upper mounting provided at an upper edge of the inner wall, the upper mounting configured to releasably connect with the wear liner, the upper mounting comprising a top plate and an upper attachment mechanism securing the top plate to the upper edge of the inner wall; and
   a lower mounting provided at a lower edge of the inner wall, the lower mounting configured to support the wear liner against the upper mounting and secure the wear liner to the inner wall;

wherein the top plate and the upper attachment mechanism are configured such that the wear liner can be slid between the top plate and the inner wall and held in place when the attachment mechanism is engaged.

2. A mulching apparatus according to claim 1, wherein the upper attachment mechanism comprises a plurality of upper bolts that are arranged to match with slots cut into a liner top edge of the wear liner such that the slots of the wear liner can be slid against the bolts.

3. A mulching apparatus according to claim 1, wherein the lower mounting comprises a bottom plate and a lower attachment mechanism configured such that the lower attachment mechanism removably secures the bottom plate and the wear liner to the inner wall.

4. A mulching apparatus according to claim 3, wherein the lower attachment mechanism comprises a plurality of lower bolts that pass through the bottom plate, the wear liner, and the inner wall.

5. A mulching apparatus according to claim 1, wherein at least one of the upper mounting and the lower mounting are configured to also act as a shearing or cutting element.

6. A mulching apparatus according to claim 1, wherein at least one of the upper mounting and the lower mounting comprises a plurality of sections wherein each section is separately removable from the inner wall.

7. A mulching apparatus according to claim 6, wherein each section is configured to be reversible such that an unworn side can be turned to be situated where a worn side was previously.

8. A mulching apparatus according to claim 1, wherein the wear liner comprises:
   a body configured to fit around the rotor of the mulching apparatus;
   a plurality of slots at an upper end of the body; and
   a flange provided at a lower end of the body and extending rearward from the body, the flange provided with a plurality of fastening holes.

9. A mulching apparatus according to claim 1, further comprising a chain assembly provided rearward from the rotor, the chain assembly comprising:
   a plurality of chains;
   a chain mounting plate comprising a plurality of chain holders, each of the plurality of chain holders configured to support an individual chain; and
   a chain support plate removably attached to the chain mounting plate to hold the plurality of chains on the chain holders of the chain mounting plate.

10. A mulching apparatus according to claim 9, wherein each of the plurality of chain holders comprise a plurality of holes configured to receive one or more links of each of the plurality of chains and support the plurality of chains in place.

* * * * *